United States Patent
Abraham et al.

[11] Patent Number: 6,069,615
[45] Date of Patent: May 30, 2000

[54] SINGLE POINTING DEVICE/KEYBOARD FOR MULTIPLE COMPUTERS

[75] Inventors: David William Abraham, Ossining; Robert Stephen Olyha, Jr., Poughkeepsie, both of N.Y.

[73] Assignee: International Business Machines Corporation, Armonk, N.Y.

[21] Appl. No.: 08/914,373

[22] Filed: Aug. 20, 1997

Related U.S. Application Data

[63] Continuation of application No. 08/699,814, Aug. 19, 1996, abandoned.

[51] Int. Cl.[7] .............................. G09G 5/00; G09G 5/08
[52] U.S. Cl. .............................. 345/168; 345/163; 345/1
[58] Field of Search .................... 345/1, 2, 145, 345/156, 157, 160, 163, 168, 329, 330, 331; 395/200.01, 200.05; 434/227, 229, 231, 233

[56] References Cited

U.S. PATENT DOCUMENTS

| | | | |
|---|---|---|---|
| 3,774,161 | 11/1973 | Chambers | 340/172.5 |
| 4,281,393 | 7/1981 | Gitelman et al. | 345/168 |
| 4,779,079 | 10/1988 | Hauck | 345/168 |
| 5,117,225 | 5/1992 | Wang | 345/2 |
| 5,214,421 | 5/1993 | Vernon et al. | 345/168 |
| 5,261,054 | 11/1993 | Lerner et al. | 345/163 |
| 5,268,675 | 12/1993 | Garthwaite et al. | 345/168 |
| 5,287,102 | 2/1994 | McKiel, Jr. | 345/168 |
| 5,287,461 | 2/1994 | Moore | 295/275 |
| 5,499,377 | 3/1996 | Lee | 395/200.01 |
| 5,500,643 | 3/1996 | Grnat | 345/168 |
| 5,504,500 | 4/1996 | Garthwaite et al. | 345/163 |
| 5,550,561 | 8/1996 | Ziarno | 345/163 |
| 5,557,299 | 9/1996 | Maynard et al. | 345/168 |

FOREIGN PATENT DOCUMENTS 401270091  10/1989  Japan .................................. 345/2

*Primary Examiner*—Jeffery Brier
*Assistant Examiner*—Paul A. Bell
*Attorney, Agent, or Firm*—Scully, Scott, Murphy & Presser; Stephen C. Kaufman, Esq.

[57] ABSTRACT

The invention discloses a microprocessor controlled assembly which allows multiple computers and display screens to be controlled using a single external pointing device/keyboard combination. The invention can provide nearly user-invisible switching for a selection of a particular computer, and can substantially reduce environmental clutter as is increasing ergonomic functioning.

8 Claims, 4 Drawing Sheets

SINGLE POINTING DEVICE/KEYBOARD FOR MULTIPLE COMPUTERS

This application is a continuation of application Ser. No. 08/699,814 filed Aug. 19, 1996, now abandoned.

FIELD OF THE INVENTION

This invention relates to an assembly for operating multiple computers and associated display screens by way of a single pointing device and keyboard combination.

BACKGROUND OF THE INVENTION

A common workplace situation features an employment of multiple computers and associated displays in a given work area. One problem with this arrangement is that there may be an accompanying clutter of duplicate keyboards and pointing devices (e.g., track ball, mouse etc.) which may limit an available workspace, as well as slow a transition for a user between the various operating sessions. For example, moving one's hands and body to allow typing and interaction from one machine to another can take time, and can often disadvantageously require physically repositioning a keyboard and pointing device.

SUMMARY OF THE INVENTION

We have addressed and solved the cited problem by recognizing that, since the function of the keyboard and pointing device is nearly identical for all commercially available machines, a reduction of clutter and increase in ergonomic functions may be obtained by using only one of each for all of the computers to be addressed.

In accordance with this point, we now disclose a novel assembly which can allow multiple computer and display screens to be controlled by using a single pointing device/keyboard combination. The novel assembly comprises:

1) a plurality of computers wherein each computer has a dedicated local keyboard comprising (i) a keyboard port and (ii) a pointing device port;
2) a single external user keyboard and pointing device; and
3) a fanout switching unit interfacing and electronically connected on one side to each of the plurality of computer keyboard and pointing device ports, and, on a second side, to the single external user keyboard and pointing device;

wherein
in response to a command from at least one of the (i) single external user keyboard or (ii) pointing device, the fanout switching unit can connect the single external user keyboard or pointing device to a particular computer.

An important advantage of the invention as defined is that it can provide a nearly user-invisible means of effecting the desired switching, so that a transition is as seamless as possible.

BRIEF DESCRIPTION OF THE DRAWING

The invention is illustrated in the accompanying drawing, in which.

DETAILED DESCRIPTION OF THE INVENTION

Figure 1:
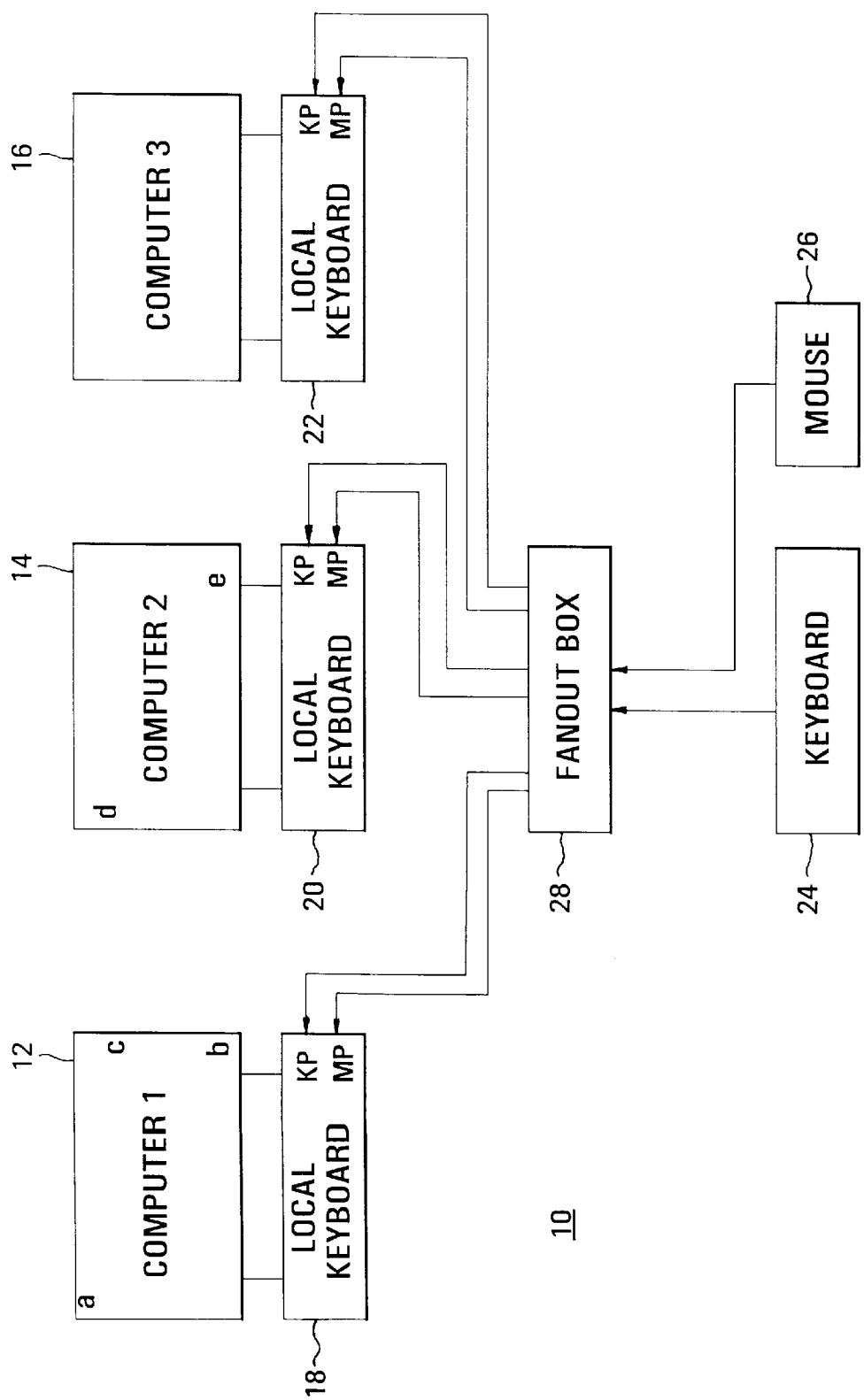
FIGS. 1 and 2 show preferred assemblies and arrangements of the present invention.

As summarized above, we propose an assembly wherein multiple computers can be controlled by a single keyboard and mouse. FIG. 1 shows an illustrative such assembly 10. In overview, the FIG. 1 assembly 10 includes a plurality of computers 12, 14, 16, each computer having, in turn, a local keyboard 18, 20, 22 and comprising a keyboard port (KP) and a mouse port (MP). The assembly 10 also includes a single external user keyboard 24 and mouse 26. A fanout switching unit 28 (preferably comprising a microprocessor-digital signal processor) interfaces and electronically connects, on one side, each of the plurality of computer keyboard and mouse ports, and, on a second side, the single external user keyboard 24 and mouse 26.

In operation, the fanout switching unit 28 can detect a desire of an operator to address a particular computer (i.e., computer 12, 14 or 16), and automatically achieve a proper switching to achieve that goal. This desire can be expressed in a number of ways, including mouse 26 position, keyboard 24 strokes, or other inputs such as an output from peripherals including eye-tracking hardware.

For example, a particularly attractive event to trigger switching between computers is to use the mouse 26 position. Since the mouse events can be routed through a microprocessor controlling the fanout switching unit 28 (discussed in detail, below) the mouse position can be calculated continuously once an initial starting point is defined. As a default, at power-up the mouse position can be assumed to initialize at an extreme position on a computer display.

Figure 2:
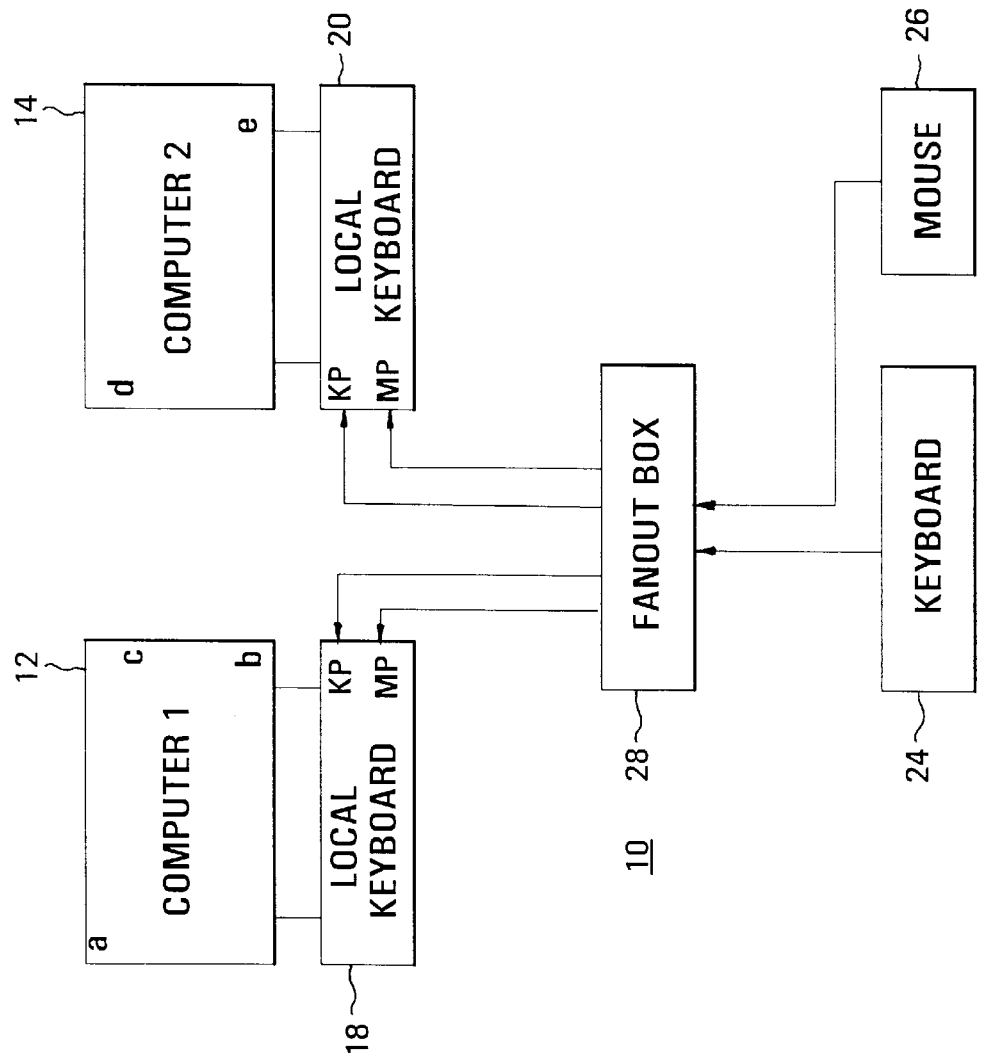

For example, as shown in FIG. 2, we disclose a two computer/monitor arrangement. Monitor 1 (computer 12) is on the left, and monitor 2 (computer 14) is on the right. At startup, each computer can place a mouse cursor at some unknown (to the controller unit) location. By default, (determined at setup by downloading instructions over the mouse or keyboard cable), the controller starts operation connected to computer 12. Mouse and keyboard commands are transmitted in the usual fashion to the microprocessor and from there to computer 12. The switch between computer 12 and 14 is achieved the first time by calculating when the mouse has moved at least 1 full screen width to the right, from it's initial unknown starting location. Subsequently, after this first switching event, the controller can calculate mouse position accurately, so that whenever the mouse hits a buffer zone on the right side of the screen (for monitor 12) or left side of the screen (for monitor 14) control may be transferred to the neighbor computer.

An alternative scheme, which allows for more precise determination of the monitor type, as well as allowing for a more flexible physical position of the workstations, can be achieved as follows. As shown in FIG. 2, the mouse is positioned at 'a' on monitor 1. This position is the upper left corner of the CRT. The mouse 26 is then clicked once. Next, the mouse 26 is moved to position 'b', the lower right corner. Finally, the mouse 26 is positioned at 'c', which is the edge at which control is to be passed to monitor 2.

At this point, the fanout switching unit 28 which is detecting the mouse events and monitoring mouse position, has both the pixel size of the screen as well as a desired 'hot zone' describing where the mouse and keyboard are to switch between computers. The fanout switching unit 28 then switches control to the second computer 14, and a similar procedure is followed to define screen dimension and the hot zone for switching to another computer. This procedure may be followed until all screens have been defined.

At this point (signalled by some means such as a keyboard stroke, a double mouse click, a right mouse click or some other similar event), control may be given to the final computer and the fanout switching unit 28 is placed in the standard controlling mode. When the mouse 26 approaches a hot zone, the fanout switching unit 28 determines appropriate switching and gives control to the proper neighbor computer.

This scheme can be extended to multiple computers, and is practically limited only in microprocessor power (to provide communications to several machines at once). Once more machines are connected to the fanout switching unit 28 than can be polled successfully with a single controller, a new fanout design can be implemented, for example, wherein several digital signal processors (DSP) are used and communicate with the mouse/keyboard switching DSP.

Alternatively to using the edges of the screens, one can place the mouse cursor on a GUI-drawn feature on the screen, coupled with a mouse click to transfer control. This action has the characteristic of a 'mouse teleporter', causing instant destruction of the cursor and recreation at a new location on another machine. This implementation requires software to be running on each computer controlled by the keyboard/mouse fanout.

Figure 3:
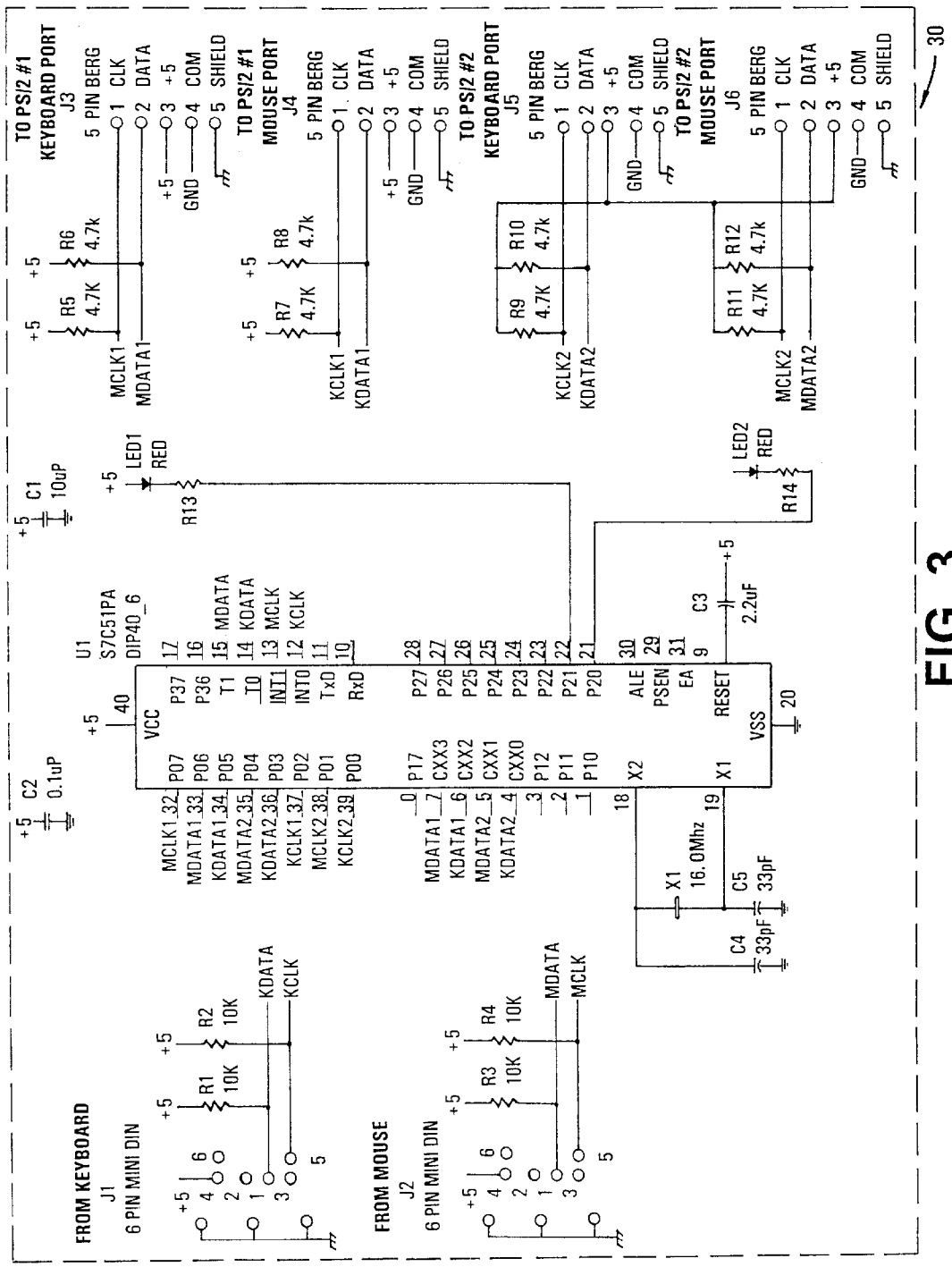
FIG. 3 shows a preferred realization of a fanout switching unit employed in an assembly.
Figure 4:
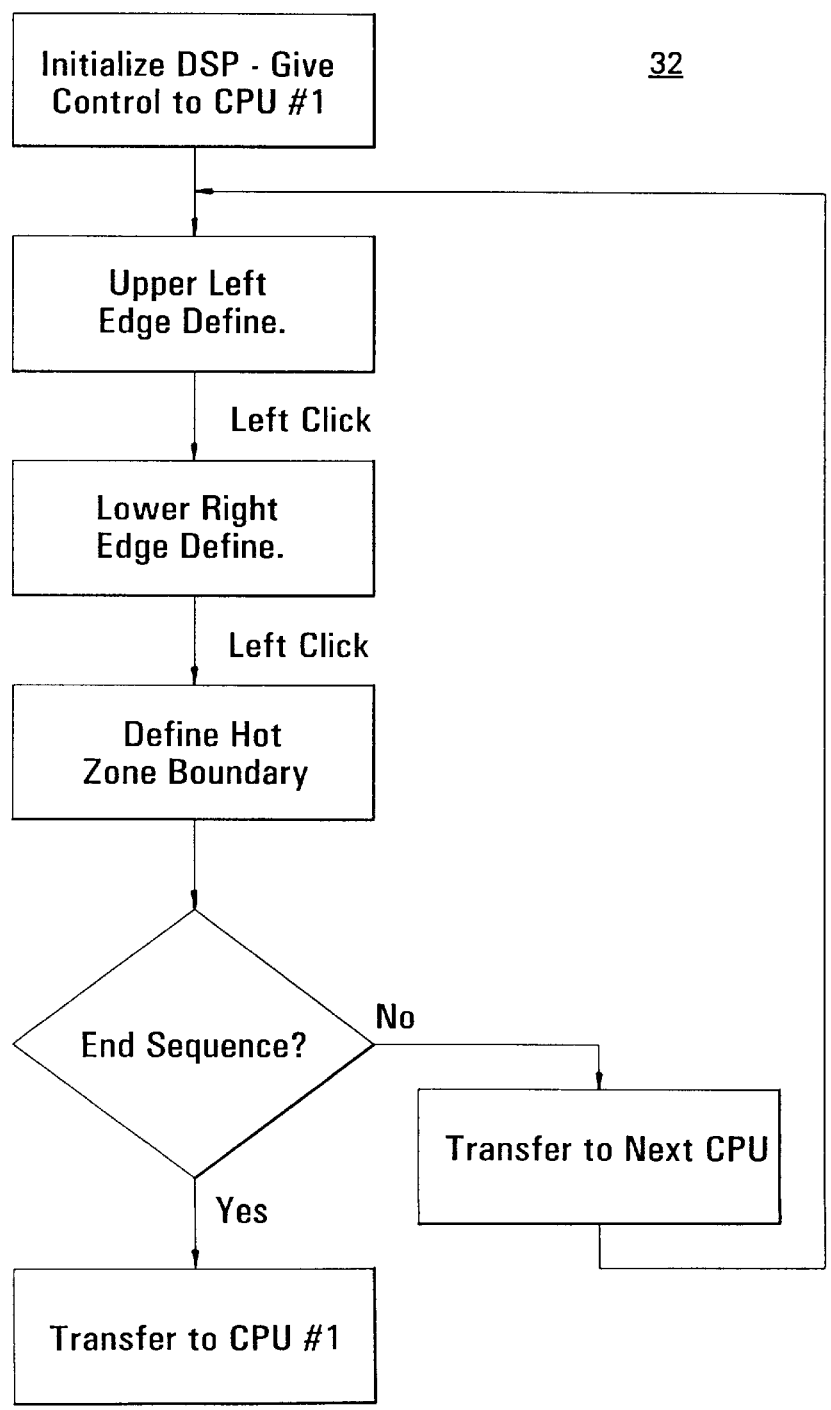
FIG. 4 provides a flowchart for operation of the FIG. 3 fanout switching unit.

Attention is now directed to FIGS. 3 and 4, which show respectively an electronic schematic of a microcontroller 30 which is a preferred realization of the fanout switching unit 28, and a flowchart 32 articulating preferred microcontroller 30 operating steps. In particular, the microcontroller 30 functions as a digital signal processor (DSP), preferably in accordance with the microcode steps specified in the FIG. 4 flowchart 32.

As described above, the microcontroller 30 is electronically connected, on a first side, to the keyboard and mouse ports of the plurality of computers, and, on a second side, to the single external user keyboard and mouse: these connections are also shown in FIG. 3.

Although there presumably exists a wide variety of computer hardware devices, the mouse and keyboard on most systems are of the PS/2 standard. Thus, for systems which use PS/2 standards for I/O, the fanout switching unit 28 can be readily designed to properly interpret an incoming mouse signal. In addition to PS/2, RS-232 mice are occasionally still found, although are rare enough to not cause sufficient market impact. Another new standard soon to be adopted is the USB (Universal Serial Bus) system. Finally, there are a number of unique systems typically in place on higher end workstations. In all cases, a translation of mouse signals to the proper scheme can be accomplished using the DSP unit, providing the DSP is aware of which type of mouse/keyboard goes with a given CPU. This can be accomplished either in a trial and error basis, with the user cycling the DSP through various options by pressing a button on the fanout switching unit 28 until proper control is obtained, or by providing a direct input from one of the machines talking through the mouse to the DSP. This latter option requires a utility running on the host CPU, which would provide a setup menu and download function.

As an additional requirement, the controller allows each machine to boot without giving keyboard and mouse errors. The microprocessor preferably includes algorithms for determining the type and characteristics of each computer to which it can provide keyboard/mouse service.

Having thus described our invention what we claim as new and desire to secure as Letters Patent, is:

1. A work station comprising:

1) a plurality of computers wherein each computer has a dedicated local keyboard comprising (i) a keyboard port and (ii) a pointing device port;

2) a single external user keyboard and pointing device; and 3) a fanout switching unit interfacing and electronically connected on one side to each of the plurality of computer keyboard and pointing device ports, and, on a second side, to the single external user keyboard and pointing device;

wherein,
   in response to a command from at least one of the (i) single external user keyboard or (ii) pointing device, the fanout switching unit can connect the single external user keyboard or pointing device to a particular computer.

2. A work station according to claim 1, wherein the fanout switching device comprises a digital signal processor.

3. A work station according to claim 1, comprising means for transferring control between computers in response to a positioning of the external pointing device.

4. A work station according to claim 3, further comprising means for initializing the transferring of control by using the external pointing device to specify a screen order and a hot zone defined with respect to each of a computer display.

5. A work station according to claim 1, wherein the pointing device comprises a mouse.

6. A work station comprising:
   a plurality of computers, each computer including
      a dedicated local keyboard including (i) a keyboard port and (ii) a pointing device port;
   a single external user keyboard;
   a single external pointing device;
   a fanout switching unit for interfacing between the computers and said external user keyboard and pointing device; and
   first connecting means directly connecting the fanout switching unit to each of the keyboard ports and to each of the pointing device ports; and
   second connecting means connecting the external user keyboard and the external pointing device to the fanout switching unit; and
   wherein the fanout switching unit includes means to connect the external user keyboard and the external pointing device to a selected one of the computers in response to a command from at least one of the external user keyboard and the external pointing device.

7. A work station according to claim 6, wherein the means to connect the external user keyboard and the external pointing device to a selected one of the computers includes means to connect the external user keyboard and the external pointing device to a selected one of the computers in response to the external pointing device being moved to a predefined position.

8. A work station according to claim 6, wherein:

each of the computers includes a display screen having a cursor and a predefined buffer zone;

the external pointing device include means to move the cursors around the display screens of the computers;

the means to connect the external user keyboard and the external pointing device to a selected one of the computers includes means to switch the external pointing device from controlling movement of the cursor around the display screen of a first of the computers to controlling movement of the cursor around the display screen of a second of the computers in response to the external pointing device moving the cursor into the buffer zone of the display screen of the first of the computers.

* * * * *

UNITED STATES PATENT AND TRADEMARK OFFICE
CERTIFICATE OF CORRECTION

PATENT NO. : 6,069,615
DATED : May 30, 2000
INVENTOR(S) : David W. Abraham, et al.

Page 1 of 1

It is certified that error appears in the above-identified patent and that said Letters Patent is hereby corrected as shown below:

<u>Title page,</u>
Item [56] References Cited, U.S. PATENT DOCUMENTS: Insert

-- 4,404,551    8/1983..............Howse et al.

4,665,501    5/1987...............Saldin et al.

4,965,560    10/1990............Riley 5,047,754    9/1991..............Akatsuka et al.

5,748,189    5/1998..............Trueblood 5,884,096    3/1999..............Beasley et al. --

Signed and Sealed this

Eleventh Day of September, 2001

*Attest:*

*Nicholas P. Godici*

NICHOLAS P. GODICI
*Attesting Officer*      *Acting Director of the United States Patent and Trademark Office*